US009664334B2

(12) United States Patent
Baker et al.

(10) Patent No.: US 9,664,334 B2
(45) Date of Patent: May 30, 2017

(54) METHOD AND APPARATUS FOR MOUNTING AN INTERACTIVE/FLAT PANEL DISPLAY DEVICE

(71) Applicant: Universal Learning Solutions, Holbrook, NY (US)

(72) Inventors: Charles Baker, Holbrook, NY (US); Michael Mignone, North Great River, NY (US); Neil Garguilo, Centerport, NY (US)

(73) Assignee: UNIVERSAL LEARNING SOLUTIONS, Holbrook, NY (US)

( * ) Notice: Subject to any disclaimer, the term of this patent is extended or adjusted under 35 U.S.C. 154(b) by 0 days.

(21) Appl. No.: 14/880,666

(22) Filed: Oct. 12, 2015

(65) Prior Publication Data

US 2017/0102108 A1   Apr. 13, 2017

(51) Int. Cl.
*F16M 13/00* (2006.01)
*F16M 13/02* (2006.01)

(52) U.S. Cl.
CPC ................................. *F16M 13/02* (2013.01)

(58) Field of Classification Search
CPC ..... A47B 97/04; A47B 96/14; A47B 96/1425; F16M 11/00
See application file for complete search history.

(56) References Cited

U.S. PATENT DOCUMENTS 2,086,009 A * 7/1937 Walker ............... A47B 96/1458
                                                     248/188
3,327,310 A * 6/1967 Bethune ............... H01Q 1/1235
                                                     248/200.1

(Continued)

FOREIGN PATENT DOCUMENTS

JP      2006060754 A    3/2006
JP         3121621 U    5/2006

(Continued)

OTHER PUBLICATIONS

International Search Report and Written Opinion for International Application No. PCT/US2016/056584; International Filing Date Oct. 12, 2016; Report Mail Date Jan. 19, 2017 (pp. 1-13).

*Primary Examiner* — Amy Sterling
(74) *Attorney, Agent, or Firm* — Bracewell LLP; Brad Y. Chin

(57) ABSTRACT

Embodiments of the invention provide an apparatus for mounting an interactive/flat panel display device to a wall. According to at least one embodiment, the apparatus includes a first vertical member including a first portion and a second portion. The first portion is at least partially inserted into the second portion. One distal end of the first portion is attached to a first plate and one distal end of the second portion is attached to a second plate. The apparatus further includes a second vertical member including a third portion and a fourth portion. The third portion is at least partially inserted into the fourth portion. One distal end of the third portion is attached to a third plate and one distal end of the fourth portion is attached to a fourth plate. The apparatus further includes a first set of brackets configured to attach the first plate and the third plate to one of a ceiling or a wall, and a second set of brackets configured to attach the second plate and the fourth plate to a flooring. Further, the apparatus includes a mounting bracket to mount the interactive/flat panel display device to the apparatus. The mounting bracket is coupled to at least one of the first vertical member and the second vertical member.

11 Claims, 6 Drawing Sheets

(56) References Cited

U.S. PATENT DOCUMENTS

| | | | | |
|---|---|---|---|---|
| 5,989,158 A | * | 11/1999 | Fredette | A63B 1/00 482/36 |
| 6,612,533 B2 | * | 9/2003 | Biles | B25H 3/006 248/125.1 |
| 7,108,235 B2 | * | 9/2006 | Kanashiki | A47B 97/04 248/125.1 |
| 8,167,152 B1 | * | 5/2012 | Gatti | E04B 2/7435 211/187 |
| 2004/0026582 A1 | | 2/2004 | Brophy et al. | |

FOREIGN PATENT DOCUMENTS

| | | | |
|---|---|---|---|
| JP | 2013231751 | A | 5/2014 |
| KR | 20070012013 | A | 1/2007 |
| WO | WO2008010736 | A1 | 1/2008 |

* cited by examiner

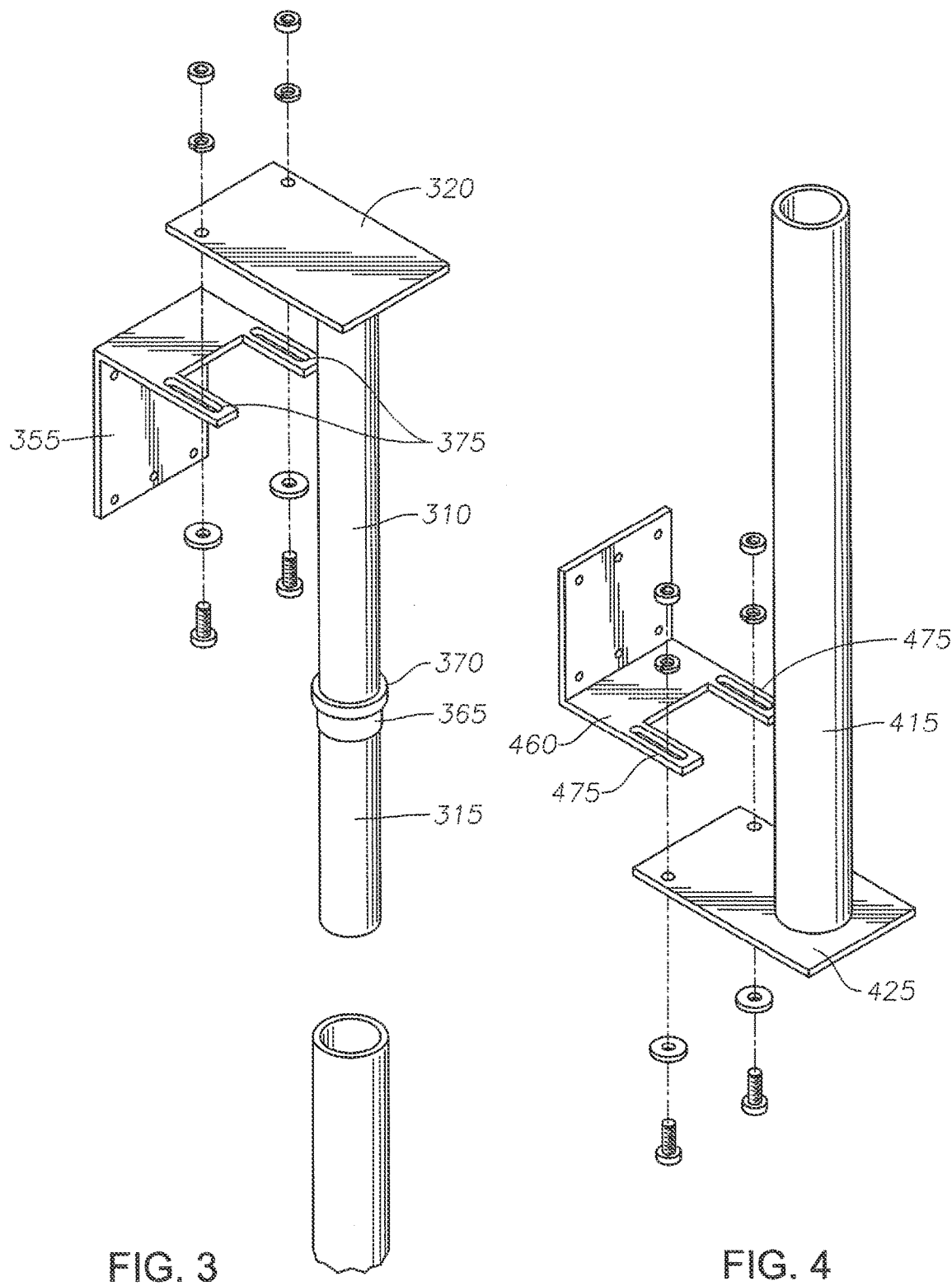

METHOD AND APPARATUS FOR MOUNTING AN INTERACTIVE/FLAT PANEL DISPLAY DEVICE

BACKGROUND

Field of the Invention

Embodiments of the invention generally relate to a method and apparatus for mounting an interactive/flat panel display device.

Description of the Related Art

Classrooms and boardrooms include traditional teaching or instructional aids, such as chalk boards, black boards, or white boards (collectively referred hereinafter as "teaching aids"), as non-limiting examples, mounted on at least one wall. Generally, these teaching aids have a tray attached near a lower part of the teaching aid. The tray is used for holding items for use with the teaching aid, such as chalk, markers, and erasers, as non-limiting examples. Instructors or presenters use these teaching aids for adding notes, comments, or illustrating concepts during the course of their instruction or presentation. Often these teaching aids cover entire areas of instructional focus, such as a forward classroom or boardroom wall. During periods of instruction or the presentation, attendees may take notes while listening to the instructor or presenter, or while observing what has been written on these teaching aids.

With the advent of the electronic age, additional classroom and boardroom teaching aids now have been developed including, for example, an interactive/flat panel display device. Through the interactive/flat panel display device, classroom or boardroom instruction may include pre-recorded instructions, or supplemental presentations from the instructor or presenter, or other instructional material from other sources. A display screen of the interactive/flat panel display device may be mounted on a wall of the classroom or boardroom. The display screen includes a bracket which attaches to the wall. The display screen hangs on the bracket.

Positioning and mounting the interactive/flat panel display device with a traditional teaching aid, such as a blackboard, is difficult. Because the teaching aid t already extends from the wall, the interactive/flat panel display device bracket cannot be easily positioned on the wall. In some instances, the interactive/flat panel display device bracket is attached directly to the blackboard. This configuration requires holes to be drilled in the blackboard, damaging the blackboard and therefore not a preferred means for attachment. In other instances, the interactive/flat panel is attached by drilling holes around the blackboard in the wall. This means of attachment is not preferred because the bracket cannot be moved, preventing repositioning of the interactive/flat panel display device for other teachers or presenters. The chalk or marker tray causes another problem. Preferably, the interactive/flat panel display device is positioned for easy access by the teacher or presenter. The interactive/flat panel display device needs to be at the same level as the existing teaching aid. Thus, the chalk or marker tray is in the way of mounting the interactive/flat panel display device. Moving the interactive/flat panel display device up puts it in the wrong position. Another way to mount the interactive/flat panel display device is to cut off a portion of the chalk or marker tray. However, this further prevents moving of the interactive/flat panel display device.

SUMMARY

Embodiments of the invention provide a mounting apparatus for an interactive/flat panel display device to be positioned in front of an existing teaching aid. The mounting apparatus is attached above the existing teaching aid and extends in front of at least a portion of the existing teaching aid. A lower portion of the mounting apparatus is fixed to the wall under the teaching aid (i.e., above the floor). According to at least one embodiment, the mounting apparatus includes an adjustable portion positioned at a lower end to adjust a distance between the existing teaching aid and the mounting apparatus. A standard mounting bracket for the interactive/flat panel display device is attachable to the mounting apparatus. The height of the mounting apparatus as well as the standard mounting bracket can be adjusted.

According to at least one embodiment, there is provided an apparatus for mounting an interactive/flat panel display device to a wall. According to at least one embodiment, the apparatus includes a first vertical member including a first portion and a second portion. The first portion is at least partially inserted into the second portion. One distal end of the first portion is attached to a first plate and one distal end of the second portion is attached to a second plate. The apparatus further includes a second vertical member including a third portion and a fourth portion. The third portion is at least partially inserted into the fourth portion. One distal end of the third portion is attached to a third plate and one distal end of the fourth portion is attached to a fourth plate. The apparatus further includes a first set of brackets configured to attach the first plate and the third plate to one of a ceiling or a wall, and a second set of brackets configured to attach the second plate and the fourth plate to a flooring. Further, the apparatus includes a mounting bracket to mount the interactive/flat panel display device to the apparatus. The mounting bracket is coupled to at least one of the first vertical member and the second vertical member.

According to at least one embodiment, each bracket of the first set of brackets and the second set of brackets includes a pair of slots, wherein the slots are configured to align with an aperture in one of the first plate, second plate, third, plate, or fourth plate, and to permit a movement of the interactive/flat panel display closer or farther away from the wall.

According to at least one embodiment, the first portion and second portion are separated by an O-ring.

According to at least one embodiment, at least a portion of the first portion has a smaller cross section than the second portion.

According to at least one embodiment, the third portion and fourth portion are separated by an O-ring.

According to at least one embodiment, at least a portion of the third portion has a smaller cross section than the fourth portion.

According to at least one embodiment, each of the first vertical member and the second vertical member has a cross sectional shape selected from the group consisting of square, rectangle, circular, octagonal, triangular, and oval.

According to at least one embodiment, each of the first vertical member and the second vertical member includes one of a metal, wood, and a polymeric material.

According to at least one embodiment, the metal is selected from the group consisting of iron, steel, stainless steel, aluminum, and copper.

According to at least one embodiment, the polymer is selected from the group consisting of polyester, polypropylene, poly vinyl chloride, and poly vinyl alcohol.

According to at least one embodiment, the O-ring includes at least one of rubber, polymer and metal.

According to at least one embodiment, the first vertical member and the second vertical member include a plurality of apertures configured to hold a mounting apparatus, wherein the mounting apparatus is configured to secure the interactive/flat panel display device to the wall.

BRIEF DESCRIPTION OF DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is a sectional view of the mounting apparatus as shown in FIG. 1 or 2 in accordance with an embodiment of the invention.

FIG. 4 is a sectional view of the mounting apparatus as shown in FIG. 1 or 2 in accordance with an embodiment of the invention.

DETAILED DESCRIPTION

Although the following detailed description contains many specific details for purposes of illustration, it is understood that one of ordinary skill in the relevant art will appreciate that many examples, variations, and alterations to the following details are within the scope and spirit of the invention. Accordingly, the exemplary embodiment of the invention described herein is set forth without any loss of generality, and without imposing limitations, relating to the claimed invention. Like numbers refer to like elements throughout.

Figure 1:
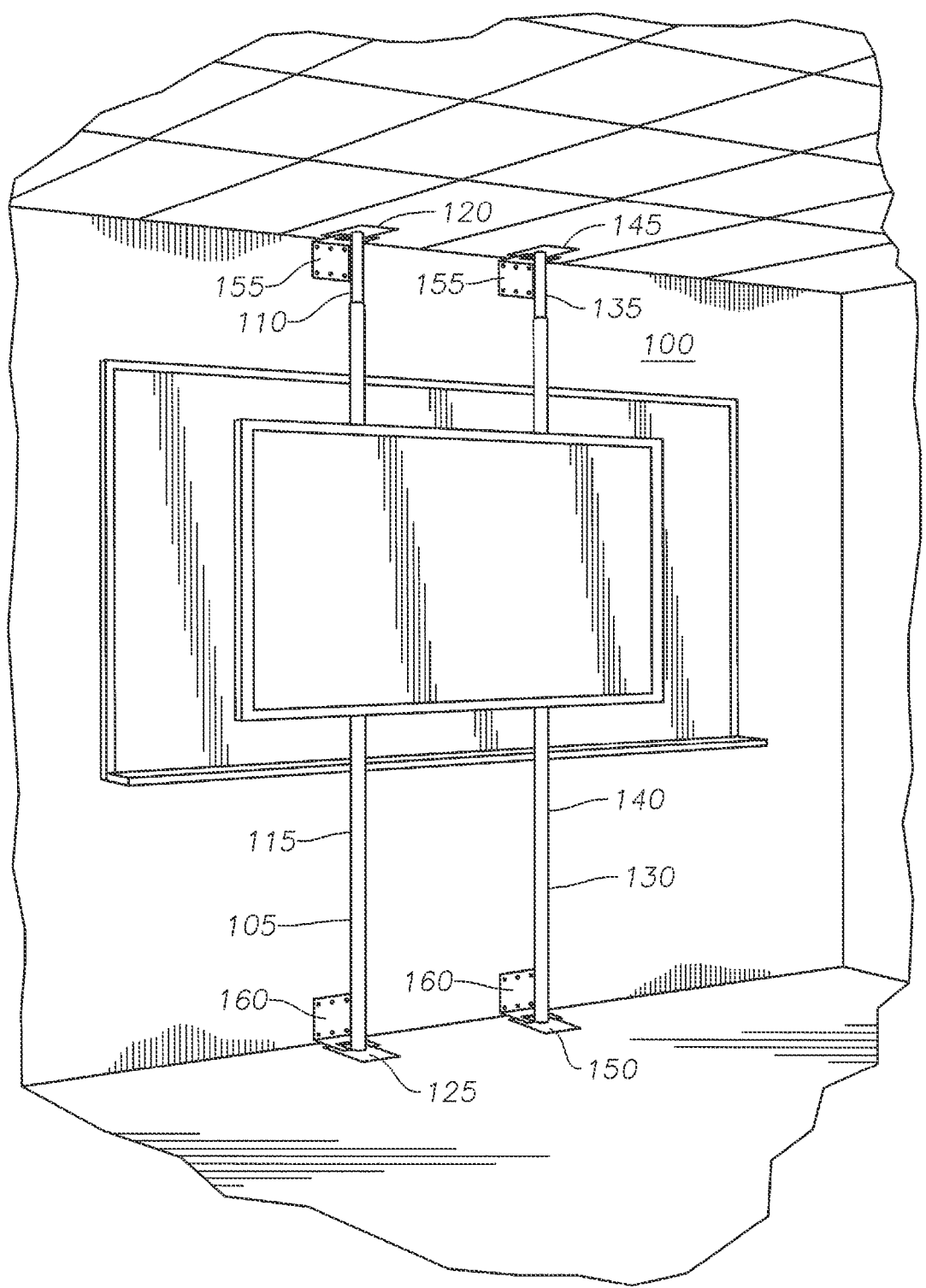
FIG. 1 is a perspective view of a mounting system in accordance with an embodiment of this invention.
Figure 2:
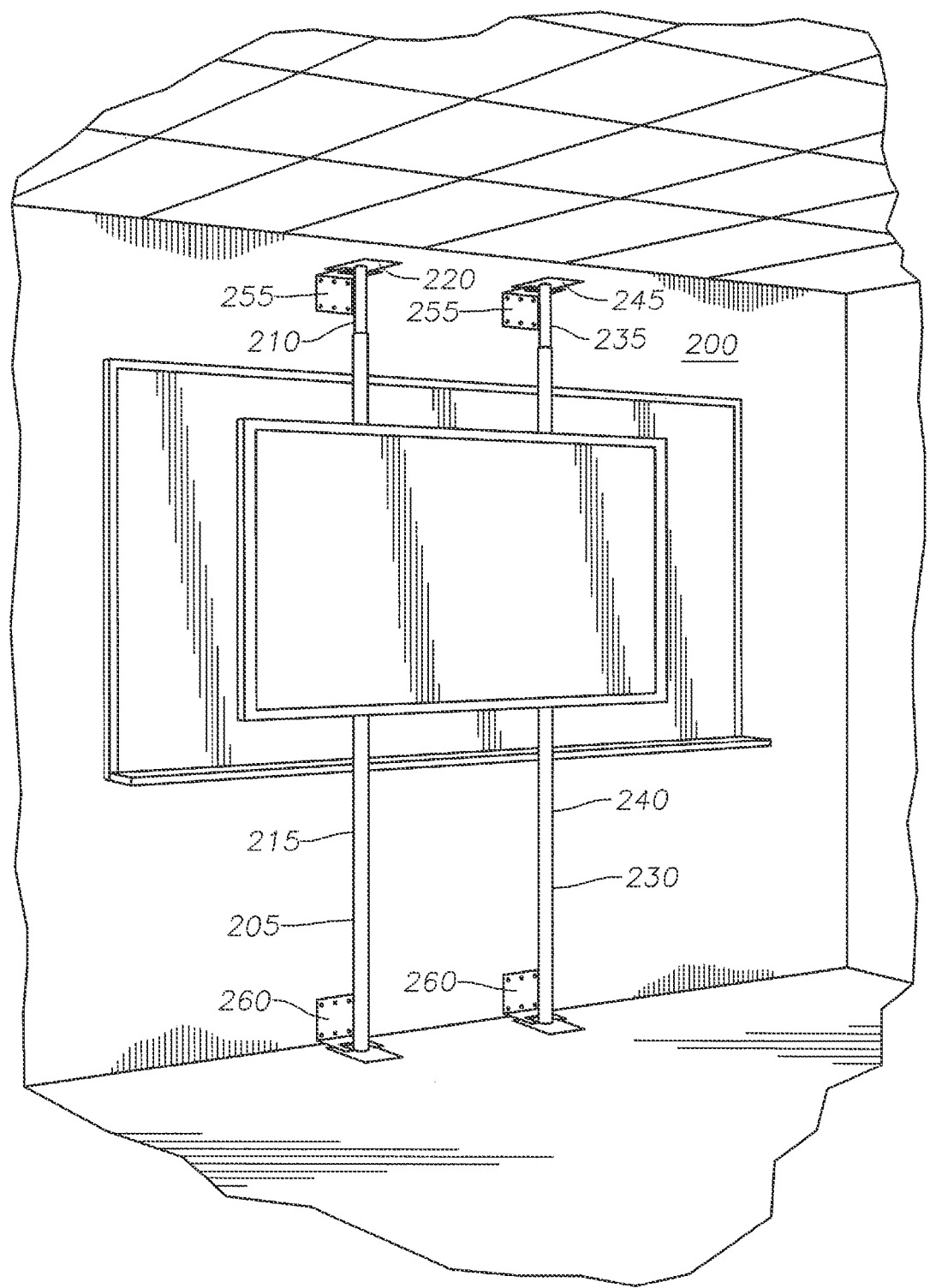
FIG. 2 is a perspective view of the mounting apparatus in accordance with another embodiment of the invention.

FIG. 1 is a perspective view of a mounting system in accordance with an embodiment of the invention. FIG. 2 is a perspective view of the mounting apparatus in accordance with another embodiment of the invention. As shown in FIGS. 1 and 2, the mounting system includes a mounting apparatus and one or more interactive/flat panel display devices or units. According to at least one embodiment, the mounting apparatus 100/200 includes a first vertical member 105/205 having a first portion 110/210 and a second portion 115/215. The first portion 110/210 is at least partially inserted into the second portion 115/215. In accordance with at least one embodiment, the first portion 110/210 has a portion with a reduced outer diameter, such that the first portion 110/210 with the reduced outer diameter is inserted into the second portion 115/215. One distal end of the first portion 110/210 is attached to a first plate 120/220 and one distal end of the second portion 115/215 is attached to a second plate 125/225, which, according to at least one embodiment, is perpendicular in plane to the first portion 110/210 and the second portion 115/215. The mounting apparatus 100/200 also includes a second vertical member 130/230 having a third portion 135/235 and a fourth portion 140/240. The third portion 135/235 is at least partially inserted into the fourth portion 140/240. In accordance with at least one embodiment, the third portion 135/235 has a portion with a reduced outer diameter, such that the third portion 135/235 with the reduced outer diameter is inserted into the fourth portion 140/240. According to at least one embodiment, one distal end of the third portion 135/235 is attached to a third plate 145/245 and one distal end of the fourth portion 140/240 is attached to a fourth plate 150/250, which may be perpendicular to a plane of the third portion 135 and the fourth portion 140. According to at least one embodiment, a first set of brackets 155/255 is used to attach the first plate 120/220 and the third plate 145/245 to a ceiling, as shown in FIG. 1, or to a wall, as shown in FIG. 2. A second set of brackets 160/260 is used to attach the second plate 125/225 and the fourth plate 150/250 to a flooring. Each of the first and second sets of brackets 155/255, 160/260 may be L-shaped brackets, although other shaped brackets would be within the knowledge of one of ordinary skill in the relevant art. The first and second sets of brackets 155/255, 160/260 are attached to the first, second, third, and fourth portions 110/210, 115/215, 135/235, 140/240, and the ceiling, flooring or wall using, for example, nuts and bolts, or screws, as will be discussed in more detail below. According to at least one embodiment, the first, second, third, and fourth plates 120/220, 125/225, 145/245, 150/250, as well as the first and second sets of brackets 155/255, 160/260 include one or more through holes, which are used to insert the bolts or screws. The through holes have internal threads that correspond to the external threads of the bolts or screws to hold the first and second sets of brackets 155/255, 160/260 firmly against the ceiling, wall, or flooring, and the first and second vertical members 105/205, 130/230 against the first and second sets of brackets 155/255, 160/260.

Figure 5:
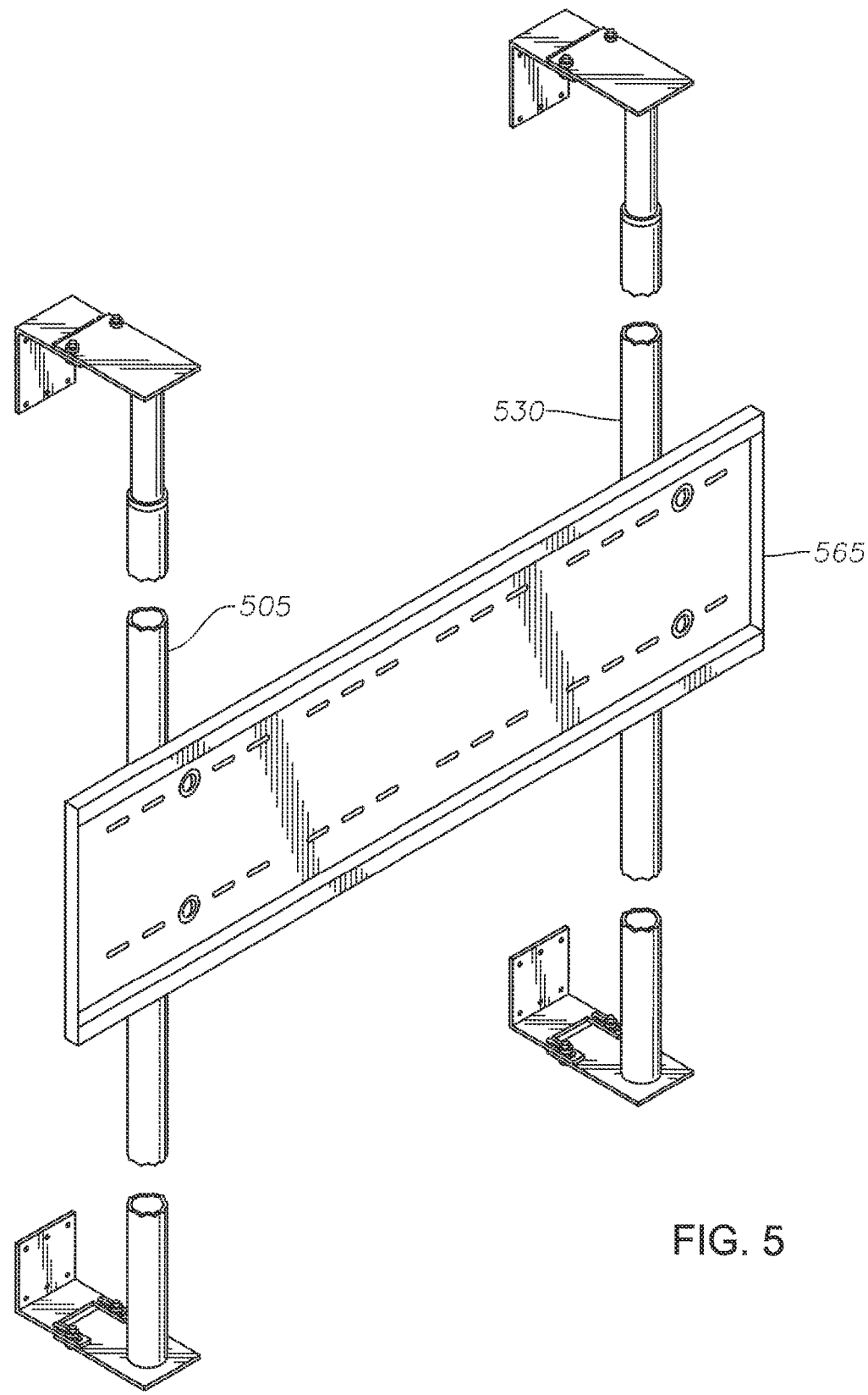
FIG. 5 is a sectional view of the mounting apparatus as shown in FIG. 1 or 2 in accordance with an embodiment of the invention.

As further shown in FIGS. 1 and 2, the first vertical member 105/205 and the second vertical member 130/230 are vertical poles that are separated by a predetermined distance. In accordance with at least one embodiment, the mounting apparatus 100/200 also includes a mounting bracket 565, as shown in FIG. 5, for mounting the interactive/flat panel display device. The mounting bracket 565 is coupled to at least one of the first vertical member 105/205 and the second vertical member 130/230 using additional screws and/or bolts and nuts.

FIG. 3 is a sectional view of the mounting apparatus as shown in FIG. 1 or 2 in accordance with an embodiment of the invention. As shown in FIG. 3, the first portion 310 and the second portion 315 are separated by an O-ring 365. At least a portion of the first portion 310 has a smaller cross section than the second portion 315, such that the first portion 310 with the smaller diameter is able to be inserted into the second portion 315. The O-ring 365 is fitted to a shoulder 370 separating the first portion 310 with the smaller diameter and the second portion 315 with the larger diameter. One distal end of the first portion 310, preferably a top end, is attached to a first plate 320, similarly illustrated in FIGS. 1 and 2, as discussed above. The first plate 320 includes, for example, one or more through holes, which are used to attach an L-shaped bracket 355 that is used to firmly attach the first portion 310 to a ceiling or a wall, as illustrated in FIGS. 1 and 2, as discussed above. As further shown in FIG. 3, according to at least one embodiment, the L-shaped bracket 355 includes a set of slots 375 aligned with the through holes in the first plate 320, allowing the first portion 310, the second portion 315, and the first plate 320 to be moved closer or further away from the wall, which permits a user to move the interactive/flat panel display device closer or further away from the wall. This configuration allows the user to adjust the location of the interactive/flat panel display device in relation to an existing teaching aid and/or a tray attached thereto.

FIG. 4 is a sectional view of the mounting apparatus as shown in FIG. 1 or 2 in accordance with an embodiment of the invention. As shown in FIG. 4, one distal end of the second portion 415, preferably a bottom end, is attached to a second plate 425. The second plate 425 is configured to be attached to another L-shaped bracket 460, which is used to firmly attach the second portion 415 to the flooring, as illustrated in FIGS. 1 and 2, as discussed above. Furthermore, as discussed above with respect to the features show in FIG. 3, the L-shaped bracket 460 includes a set of slots 475 aligned with the through holes in the second plate 425, allowing the first portion (not shown), the second portion 415, and the second plate 425 to be moved closer or further away from the wall, which permits a user to move the interactive/flat panel display device closer or further away from the wall. This configuration allows the user to adjust the location of the interactive/flat panel display device in relation to an existing teaching aid and/or a tray attached thereto.

One of ordinary skill in the relevant art would have appreciated that the third and fourth portions, as illustrated in FIGS. 1 and 2, also are separated by an O-ring (not shown). Similarly, as discussed above with respect to the first and second portions 310, 315, at least a portion of the third portion (not shown) has a smaller cross section than the fourth portion (now shown). Furthermore, the third and fourth portions include similar L-shaped brackets discussed above with respect to L-shaped brackets 355, 460.

According to at least one embodiment, the first vertical member 110/210/310 or the second vertical member 115/215/315 has a cross sectional shape selected from the group consisting of square, rectangle, circular, octagonal, triangular, and oval, although only a circular cross section is illustrated in FIGS. 1-7. According to at least one embodiment, the first vertical member 110/210/310 or the second vertical member 115/215/315 includes one of a metal, wood, and a polymeric material. The metal is selected from the group consisting of iron, steel, stainless steel, aluminum, and copper. The polymer is selected from the group consisting of polyester, polypropylene, poly vinyl chloride, and poly vinyl alcohol. The O-ring 365 includes at least one of rubber, polymer, and a metal.

Additional hardware components, such as lock washers, split rings, nuts may be used to firmly hold the members together, as shown, for example, in FIGS. 3 and 4.

FIG. 5 is a sectional view of the mounting apparatus as shown in FIG. 1 or 2 in accordance with an embodiment of the invention. In this embodiment, a standard mounting bracket 565 is attached to the mounting apparatus described in the above embodiments using one or more screws or bolts and nuts. The mounting bracket 565 includes a frame body that extends between the first vertical member 505 and the second vertical member 530 and is secured using one or more screws or bolts and nuts. The mounting bracket 565 is configured to mount an interactive/flat panel display device, which may be installed right in front of blackboard teaching aid without the need for disrupting the existing set up in a teaching environment. i.e., classroom or a boardroom of a school or business office.

Figure 6:
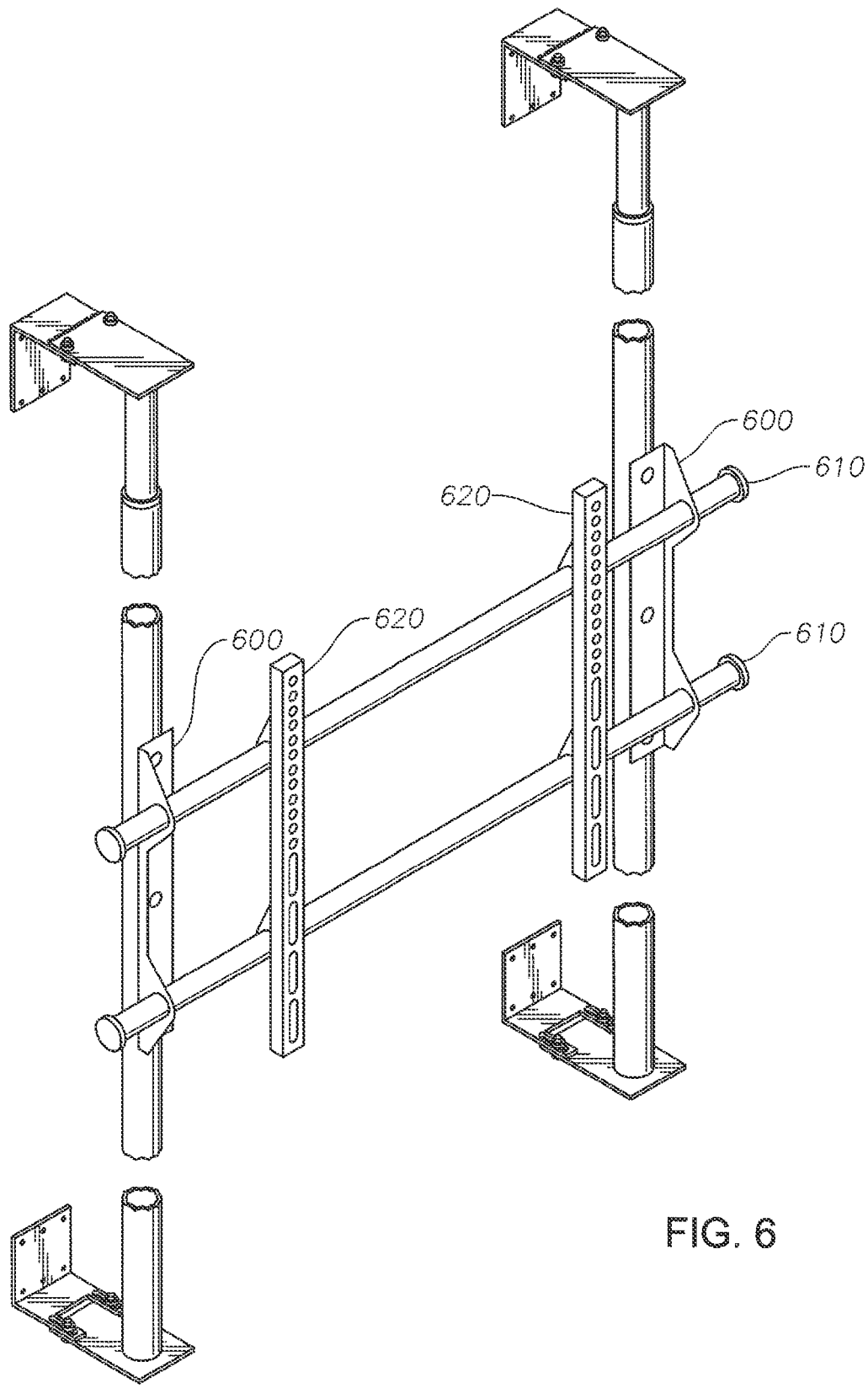
FIG. 6 is a sectional view of the mounting apparatus as shown in FIG. 1 or 2 in accordance with an embodiment of the invention.

FIG. 6 is a sectional view of the mounting apparatus as shown in FIG. 1 or 2 in accordance with an embodiment of the invention. In this embodiment, the mounting bracket includes a set of vertical brackets 600 that are used to install the mounting bracket on the mounting apparatus. The vertical brackets 600 are supported by a set of horizontal rods 610 that extend between the body of the vertical brackets 600. The horizontal rods 610 have installed on them a set of support brackets 620 that are used to mount the interactive/flat panel display device, which may be installed right in front of a teaching aid without the need for disrupting the existing set-up in a teaching environment. The vertical brackets 600, horizontal rods 610, and support brackets 620 have one or more through holes with internal threads to insert one or more bolts or screws to firmly engage with the other members and hold them in place.

Figure 7:
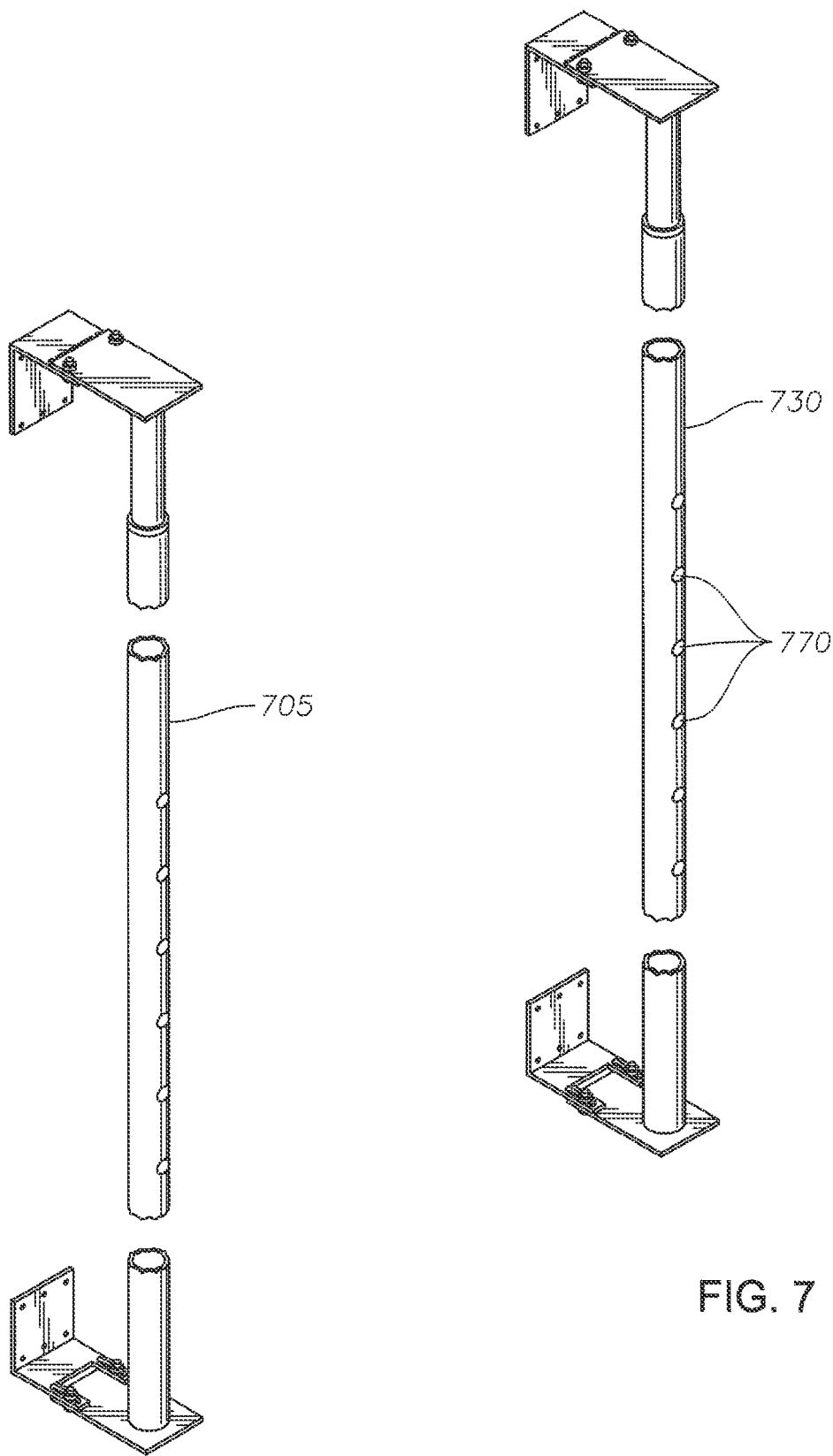
FIG. 7 is a sectional view of the mounting apparatus as shown in FIG. 1 or 2 in accordance with an embodiment of the invention.

FIG. 7 is a sectional view of the mounting apparatus as shown in FIG. 1 or 2 in accordance with an embodiment of the invention. As shown in FIG. 7, each of the first vertical member 705 and the second vertical member 730 includes a plurality of through holes 770, allowing for the attachment of the vertical brackets (not shown) of the mounting apparatus, as shown in FIG. 6.

According to at least one embodiment, there is provided a method for mounting a display device. The method, according to at least one embodiment, includes attaching a first vertical member to a ceiling, flooring, or wall. The first vertical member includes a first portion and a second portion. The first portion is configured to be at least partially inserted into the second portion. One distal end of the first portion is attached to a first plate and one distal end of the second portion is attached to a second plate. The method also includes attaching a second vertical member to a ceiling, flooring, or wall. The second vertical member includes a third portion and a fourth portion. The third portion is configured to be at least partially inserted into the fourth portion. One distal end of the third portion is attached to a third plate and one distal end of the fourth portion is attached to a fourth plate. The method also includes attaching a mounting bracket to at least one of the first vertical member and the second vertical member for mounting the interactive/flat panel display device.

According to at least one embodiment, the method additionally includes attaching the first plate and the third plate to the ceiling or wall using a first set of brackets. The method further includes attaching the second plate and the fourth plate to the flooring using a second set of brackets. The first portion and second portion are separated by an O-ring. Similarly, the third portion and fourth portion are also separated by an O-ring.

Embodiments of the invention may suitably comprise, consist or consist essentially of the elements disclosed and may be practiced in the absence of an element not disclosed. For example, it can be recognized by those skilled in the art that certain structural elements can be combined into a single structural element.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the embodiments of the present invention.

The terms "vertical", "horizontal", "upward", "downward", "above", and "below" and similar spatial relation terminology are used herein only for convenience because elements of the current disclosure may be installed in various relative positions.

Although embodiments of the invention have been described in detail, it should be understood that various changes, substitutions, and alterations can be made hereupon without departing from the principle and scope of the invention. Accordingly, the scope of the embodiments of invention should be determined by the following claims and their appropriate legal equivalents.

What is claimed is:

1. An apparatus for mounting an interactive or flat panel display device to a wall, the apparatus comprising:
  a first vertical member comprising a first portion and a second portion, the first portion configured to be at least partially inserted into the second portion, wherein one distal end of the first portion is attached to a first plate and one distal end of the second portion is attached to a second plate;
  a second vertical member comprising a third portion and a fourth portion, the third portion configured to be at least partially inserted into the fourth portion, wherein one distal end of the third portion is attached to a third plate and one distal end of the fourth portion is attached to a fourth plate;
  a first set of brackets configured to attach the first plate and the third plate to one of a ceiling or a wall;
  a second set of brackets configured to attach the second plate and the fourth plate to a flooring; and
  a mounting bracket configured to mount the interactive or flat panel display device to the apparatus, the mounting bracket coupled to at least one of the first vertical member and the second vertical member,
  wherein each bracket of the first set of brackets and the second set of brackets comprises a pair of slots, wherein the slots are configured to align with an aperture in one of the first plate, second plate, third, plate, or fourth plate, and to permit a movement of the interactive or flat panel display closer or farther away from the wall.

2. The apparatus of claim 1, wherein the first portion and second portion are separated by an O-ring.

3. The apparatus of claim 2, wherein at least a portion of the first portion has a smaller cross section than the second portion.

4. The apparatus of claim 1, wherein the third portion and fourth portion are separated by an O-ring.

5. The apparatus of claim 4, wherein at least a portion of the third portion has a smaller cross section than the fourth portion.

6. The apparatus of claim 1, wherein each of the first vertical member and the second vertical member has a cross sectional shape selected from the group consisting of square, rectangle, circular, octagonal, triangular, and oval.

7. The apparatus of claim 1, wherein each of the first vertical member and the second vertical member comprises one of a metal, wood, and a polymeric material.

8. The apparatus of claim 1, wherein each of the first vertical member and the second vertical member comprises a metal, wherein the metal is selected from the group consisting of iron, steel, stainless steel, aluminum, and copper.

9. The apparatus of claim 1, wherein each of the first vertical member and the second vertical member comprises a polymeric material, wherein the polymeric material is selected from the group consisting of polyester, polypropylene, poly vinyl chloride, and poly vinyl alcohol.

10. The apparatus of claim 2, wherein the O-ring comprises at least one of rubber, polymer and metal.

11. The apparatus of claim 1, wherein each of the first vertical member and the second vertical member comprises a plurality of apertures configured to hold a mounting apparatus, wherein the mounting apparatus is configured to secure the interactive or flat panel display device to the wall.

* * * * *